US 6,393,433 B1
May 21, 2002

(12) United States Patent
Kalavade et al.

(54) METHODS AND APPARATUS FOR EVALUATING EFFECT OF RUN-TIME SCHEDULES ON PERFORMANCE OF END-SYSTEM MULTIMEDIA APPLICATIONS

(75) Inventors: Asawaree Kalavade; Pratyush Moghe, both of Aberdeen, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/159,706

(22) Filed: Sep. 24, 1998

(51) Int. Cl.⁷ ............................................. G06F 17/00
(52) U.S. Cl. ..................... 707/200; 709/106; 709/319
(58) Field of Search ............... 707/1–206; 709/100–332

(56) References Cited

U.S. PATENT DOCUMENTS 6,201,996 B1 * 3/2001 Crater et al. .................... 700/9
6,263,358 B1 * 7/2001 Lee et al. .................... 709/100

OTHER PUBLICATIONS

C.L. Liu et al., "Scheduling Algorithms for Multiprogramming in a Hard Real–Time Environment," JACM, vol. 20, pp. 46–61, 1973.
K. Ramamritham et al., "Scheduling Algorithms and Operating Systems Support for Real–Time Systems," Proc. of the IEEE, vol. 82, No. 1, pp. 55–66, Jan. 1994.
L. Sha et al., "Generalized Rate–Monotonic Scheduling Theory: A Framework for Developing Real–Time Systems," Proc. of the IEEE, vol. 82, No. 1, pp. 68–82, Jan. 1994.
D.I. Katcher et al., "Engineering and Analysis of Fixed Priority Schedulers," IEEE Trans. of Software Engg., pp. 1–16, Sep. 1993.
K. Jeffay et al., "On Non–Preemptive Scheduling of Periodic and Sporadic Tasks," Proc. of Real–Time Systems Symposium, pp. 129–139, 1991.
J.V. Busquets–Matiax et al., "Adding Instruction Cache Effect to an Exact Schedulability Analysis of Preemptive Real–Time Systems," 8th Euromicro Workshop on Real–Time Systems, Jun. 1996.
R. Yavatkar et al., "A CPU Scheduling Algorithm for Continuous Media Applications," 5th Intl. Workshop on Network and OS Support for Digital Audio and Video (NOSS–DAV), pp. 223–226, Apr. 1995.
C.W. Mercer et al., "Processor Capacity Reserves: Operating System Support for Multimedia Applications," IEEE Intl. Conf. on Multimedia Computing and Systems, pp. 90–99, May 1994.

(List continued on next page.)

Primary Examiner—David Jung
(74) Attorney, Agent, or Firm—Ryan, Mason & Lewis, LLP

(57) ABSTRACT

A method of evaluating an effect of a run-time scheduling policy on a performance of an end-system, having associated resources, running one or more applications, each application having one or more tasks and the tasks being mapped to the associated resources of the end-system, includes generating a state process having a state space representative of an evolution of computation associated with the end-system, the evolution being representative of task transitions with respect to the applications, available resources and the run-time scheduling policy. Then, given the state space generated with respect to, inter alia, the specified run-time scheduling policy, the method includes computing performance metrics from the state process, the performance metrics being representative of the effect of the run-time scheduling policy on the performance of the one or more applications running on the end-system. The method preferably calculates the performance in terms of the probability distribution of the processing delay of each application and a deadline miss probability.

38 Claims, 6 Drawing Sheets

OTHER PUBLICATIONS

R. Gopalakrishnan et al., "Bringing Real–time Scheduling Theory and Practice Closer for Multimedia Computing," Proc. of 1996 ACM SIGMETRICS Intl. Conference on Measurement and Modeling of Computer Systems, Philadelphia, PA, USA, pp. 1–17, May 1996.

S. Chatterjee et al., "A Generalized Admissions Control Strategy for Heterogeneous, Distributed Multimedia Systems," Proc. of ACM Multimedia, pp. 1–12, 1995.

H.M. Vin et al., "A Statistical Admission Control Algorithm for Multimedia Servers," Proc. of ACM Multimedia, pp. 33–40, 1994.

J. Kim et al., "Execution Time Analysis of Communicating Tasks in Distributed Systems," IEEE Trans. on Computers, vol. 45, No. 5, pp. 572–579, May 1996.

Y.A. Li et al., "Estimating the Execution Time Distribution for a Task Graph in a Heterogeneous Computing System," Proc. Sixth Heterogeneous Computing Workshop (HCW) Geneva, Switzerland, pp. 172–184, 1997.

P. Moghe et al., "Terminal QoS of Adaptive Applications and its Analytical Computation," Proc. of 5th Intl. Workshop on Quality of Service (IWQoS97), pp. 1–12, May 1997.

Y.S. Li et al., "Performance Estimation of Embedded Software with Instruction Cache Modeling," ICCAD, 1995.

* cited by examiner

METHODS AND APPARATUS FOR EVALUATING EFFECT OF RUN-TIME SCHEDULES ON PERFORMANCE OF END-SYSTEM MULTIMEDIA APPLICATIONS

FIELD OF THE INVENTION

The invention relates to methods and apparatus for evaluating software run-time schedulers and, more particularly, to quantifying the impact of software run-time schedulers on the performance of software applications running on embedded multimedia end-systems.

BACKGROUND OF THE INVENTION

Embedded multimedia end-systems, such as, for example, personal digital assistants (PDAs), set-top boxes, and Internet terminals, often need to support multiple concurrent tasks such as, for example, audio, speech, video, graphics, and modem. While such end-systems typically have limited processing capability, they are being used to support increasingly sophisticated multimedia applications.

Multimedia applications typically impose real-time processing constraints. In other words, such applications have to finish processing within a certain time deadline. However, such applications can tolerate a small number of misses when the processing takes longer than the prescribed deadline. A multimedia application may have a performance constraint such as, for example, "no more than 5% of deadlines may be missed." Such a constraint is referred to as a soft deadline constraint. End-systems typically support multimedia applications with soft deadlines through sophisticated software run-time schedulers.

One way a run-time scheduler supports multiple applications is through first-come first-serve (FCFS) scheduling, where each application gets its turn in order of arrival of the application. However, such a scheduling discipline may not allow the end-system to support applications with distinct deadlines. Consequently, there is a trend toward use of more sophisticated schedulers which allow priorities to be specified for applications. Earliest deadline first (EDF) and rate monotonic (RM) scheduling are examples of priority-based scheduling.

Given a particular architecture of an embedded system and a set of applications, it is unclear whether a particular run-time scheduler can support the multimedia applications adequately. There is no known method or apparatus which analytically computes the impact of different priority-based run-time scheduling policies on the performance of multimedia applications in terms of the soft deadline performance. Further, it is often necessary to control these schedulers in order to support the multimedia applications efficiently.

It is known that simulation may be used as a tool for predicting the performance of end-systems. However, simulation is inherently computation-intensive and, thus, time consuming, especially when thousands of runs are required in gathering statistics such as how often a deadline is missed. Alternatively, other conventional methods such as rate-monotonic analysis (RMA) can not be used when applications have soft deadlines or variability, as is the case with multimedia applications.

SUMMARY OF THE INVENTION

The invention provides methodology and apparatus for calculating the performance of one or more applications running on an end-system which has been configured with a particular run-time scheduling policy.

In one aspect of the invention, a method of evaluating an effect of a run-time scheduling policy on a performance of an end-system, having associated resources, running one or more applications, each application having one or more tasks and the tasks being mapped to the associated resources of the end-system, is disclosed. The method includes generating a state process having a state space representative of an evolution of computation associated with the end-system, the evolution being representative of task transitions with respect to the applications, available resources and the run-time scheduling policy. Then, given the state space generated with respect to, among other things, the specified run-time scheduling policy, the method includes computing performance metrics from the state process, the performance metrics being representative of the effect of the run-time scheduling policy on the performance of the one or more applications running on the end-system. The invention preferably calculates the performance in terms of the probability distribution of the processing delay of each application and a deadline miss probability. Such performance metrics may be used to influence the behavior of the run-time scheduler in the system in order to ensure that all applications get their due share of the end-system resources.

Advantageously, the methodology and apparatus of the invention can be used to control the run-time scheduler on the end-system so that it can provide adequate support to applications running on the end-system. In a preferred embodiment, the applications are multimedia applications and the end-system is an embedded end-system. The run-time scheduling policies may be priority-based, e.g., RM and EDF, or nonpriority-based, e.g., FCFS.

DETAILED DESCRIPTION OF PREFERRED EMBODIMENTS

Figure 1:
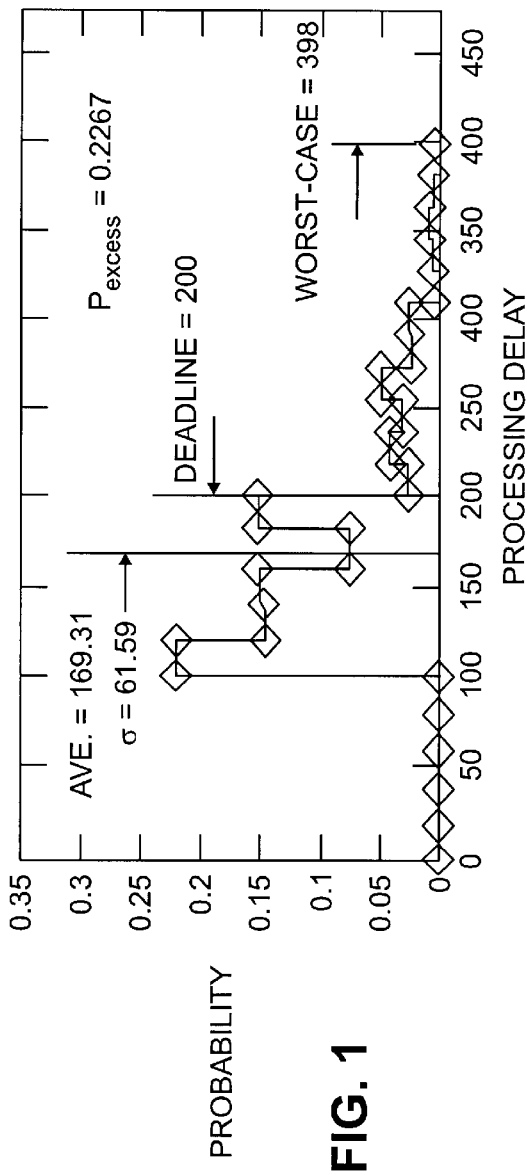
FIG. 1 is a graphical representation of a processing delay distribution for an exemplary audio application.

The invention will be described below in the context of multimedia applications and embedded end-systems; however, it should be understood that the invention is not limited to such applications or system architectures. Rather, the teachings described herein are applicable to quantitative evaluation of the effects of run-time schedulers on the performance of a variety of applications capable of running on a variety of system architectures. Further, the term "processor" as used herein is intended to include any processing device which may be utilized in an end-system such as, for example, a PDA, a set-top box or an Internet terminal. Such a processing device may, itself, include a central processing unit (CPU) operatively coupled to associated memory, such as RAM, ROM, a fixed memory device (e.g., hard drive), or a removable memory device (e.g., diskette) via a computer interface bus. In addition, the processing device may include one or more input devices, e.g., keyboard, for inputting data, e.g., input specifications, to the processing unit, as well as one or more output devices, e.g., CRT display and/or printer, for providing results, e.g., performance metrics, and other data to a user. Further, it is to be understood that one or more CPUs within the end-system may share associated memory resources. Accordingly, the software instructions or code for performing the methodology of the invention, described herein, may be stored in one or more of the associated memory devices (ROM, fixed or removable memory) and, when ready to be utilized, loaded into RAM and executed by a CPU. The applications may also be stored and executed in a similar fashion in which case, where necessary, the processing device may also include one or more digital signal processors for processing the data signals, e.g., audio, speech, video, graphics, etc., associated with the application.

It is to be appreciated that the present invention is related to the teachings disclosed in U.S. Pat. No. 5,961,599 which issued on Oct. 5, 1999 and is entitled "Apparatus and Method for Computing the Processing Delay of Adaptive Applications on Network Terminals and Applications Thereof," the disclosure of which is incorporated herein by reference.

As will be explained in detail below, the methods and apparatus of the invention provide an efficient analytical approach to evaluate the impact of running scheduling policies on the performance of applications with task-level variability. The invention preferably assumes that the applications are specified by task graphs with precedence constraints. The tasks are at an algorithmic or functional level. For example, discrete cosine transform (DCT) and variable length encoding (VLE) are considered tasks in a video application. In accordance with the invention, it is to be appreciated that each task can be characterized by a distribution of its execution time. Such distribution approximates the variability within tasks (data and control dependent changes in execution time) as well as the dynamics introduced by the particular architecture of the system running the application, e.g., variability introduced by caches, communication delays, etc. Distributions can be arbitrary; different tasks can have different distributions. Further, each application is preferably assumed to be periodic (with a specified period) and is associated with a deadline interval that is less than or equal to the period. The end-system architecture preferably consists of one or more programmable processors and custom hardware accelerators. The invention also preferably assumes that the mapping of tasks is known. Also, it allows the user (e.g., designer) to select a scheduling policy. Examples of scheduling policies which may be implemented according to the methods and apparatus of the invention include: earliest deadline first (EDF), rate monotonic (RM), and first-come first-served (FCFS). However, the invention is not limited to only these run-time schedulers.

Given these inputs, the methods and apparatus of the invention compute the performance of the applications in terms of processing delay distribution. The term processing delay distribution refers to the distribution of the time taken to process an iteration of each application. Advantageously, such a distribution provides considerable insight into the resource availability of the system. The evolution of computation in the system is modeled in the invention as a stochastic process, referred to as the state process. As a result, the state process is semi-Markovian for a variety of run-time schedulers such as, for example, EDF, RM and FCFS. Based on the statistics of such a process, a precise processing delay distribution is efficiently computed for each application. By allowing the designer to experiment with different run-time schedulers, the methods and apparatus of the invention provide a framework for systematically quantifying their effect on the performance of the applications and on the end-system.

In order to appreciate the utility of the processing delay distribution, the following illustration may be considered. Assume that an audio application, e.g., MPEG audio encode, and a video application, e.g., MPEG video encode, run concurrently on a single processor under an EDF scheduling policy. Further, assume that the audio application has a period of 200 units. Referring now to FIG. 1, a processing delay distribution is shown for the audio application. As shown, 22% of the iterations finish in 100 units, 15% take 120 units, and so on. From this distribution, several parameters may be determined. For example, the average processing delay is 169.31 units, the standard deviation is 61.59 units and the worst case delay is 398 units. Another useful measure is the excess delay probability or the probability that the application misses its deadline. In this example, 22.67% of iterations miss the deadline. Depending on the requirements of the application, this may or may not be acceptable. A metric such as the processing delay distribution captures realistic constraints on applications that can not ordinarily be obtained by just the worst-case or average delay. Advantageously, this allows the end-system to be designed more efficiently by reducing slack. For instance, if almost all the iterations finish within about 60% of the deadline, such result may indicate that a higher quality application may be satisfactorily sustained (e.g., a higher frame rate for a video application) on the same end-system.

In yet another example illustrating the utility of such a distribution of processing delay, when designing multimedia systems with soft deadlines, consider admission control techniques which are traditionally used to determine the feasibility of an application set. For example, using the classic EDF admission test, a set of tasks is feasible under the EDF scheduling policy if $\Sigma e_i/D_i \geq 1$, where $e_i$ is the execution time of the task i and $D_i$ is the deadline of the task i. Considering the same two concurrent audio and video applications described above, Table 1 shows the parameters of these applications in a simplified form.

TABLE 1

| Application | Average execution time $e_i$ | Worst-case execution time $e_i$ | Deadline $D_i$ |
| --- | --- | --- | --- |
| audio | 100 | 110 | 200 |
| video | 341 | 480 | 660 |
| $\Sigma e_i/D_i$ | 1.02 | 1.28 | |

It is assumed that all the tasks in the audio (video) application are clubbed together to form one audio (video) task. Column two gives the average execution times of these applications, column three gives the worst-case execution times of these applications, and column four gives the deadlines. Row four indicates $\Sigma e_i/D_i$. According to this analysis, the application set is infeasible under hard deadlines under both average and worst-case conditions given that $\Sigma e_i/D_i$ is greater than one. According to conventional techniques, there is no way to determine the behavior of the system under soft deadline constraints. The processing delay distribution, as computed by the methodology described herein, gives considerable insight into the operation of the end-system.

Figure 2:
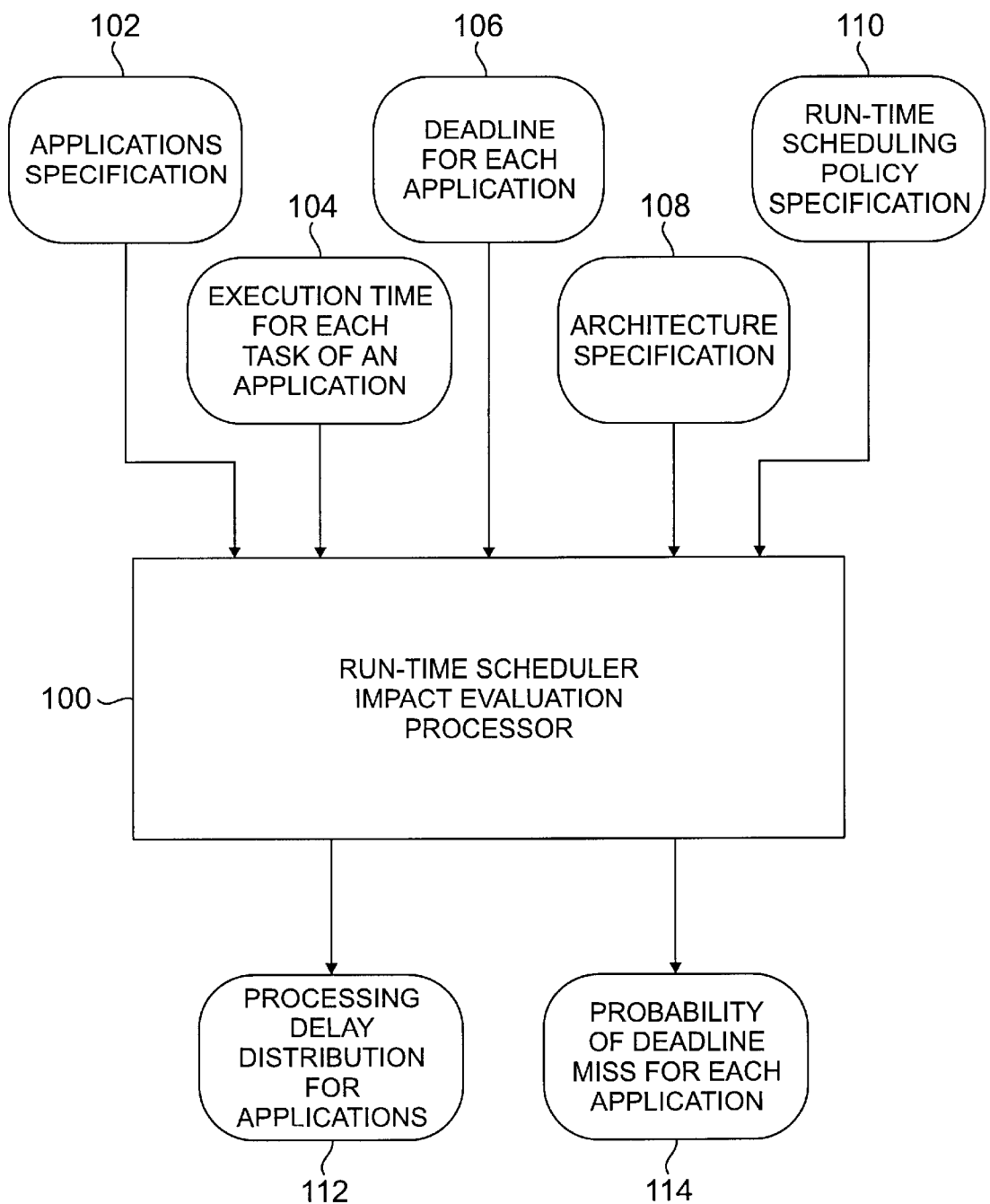
FIG. 2 is a block diagram illustrating apparatus for evaluating the impact of run-time scheduling policies on applications running on a specified system architecture according to the invention.

Referring to FIG. 2, a block diagram illustrating a run-time scheduler impact evaluation processor 100, and its input and output specifications, is shown. As mentioned, inputs to the processor 100 include: applications specification (102); specification of the execution time of each task of an application (104); specification of the deadline for each application (106); architecture specification which includes specification of the number of processors and mapping of tasks to processors (108); and specification of run-time scheduling policy (110). It is to be understood that such input data may be stored in a memory associated with the processor 100. Advantageously, the processor 100 performs the methodology illustrated in FIG. 3 and, as a result, generates a processing delay distribution for applications (112), as a function of the specified run-time scheduling policy, and the probability of a deadline miss for each application (114), also as a function of the specified run-time scheduling policy. These results may also be stored in associated memory of the processor 100 and/or presented to a user.

Figure 3:
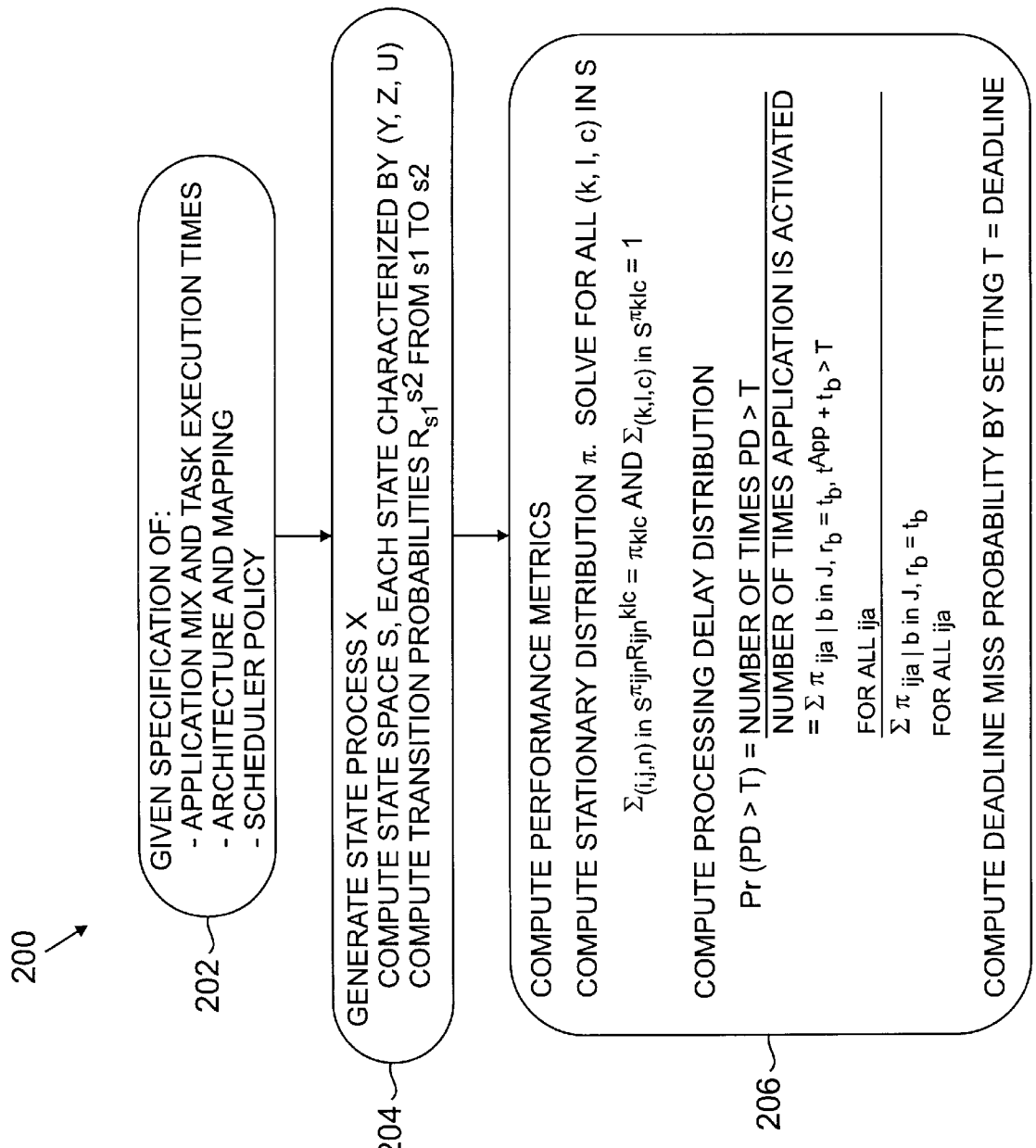
FIG. 3 is a flow chart illustrating a process for evaluating the impact of run-time scheduling policies on applications running on a specified system architecture according to the invention.

A methodology 200 of the invention is shown in the flow chart of FIG. 3. Generally, given the specification of an application mix and associated task execution times, a system architecture, task-to-resource mapping, and a run-time scheduler policy (step 202) as input data, the methodology 200 includes: generating a state process (step 204), and computing performance metrics in accordance with the state process (step 206). Each of the steps of the methodology 200 will be described in detail in the following sections.

Figure 4:
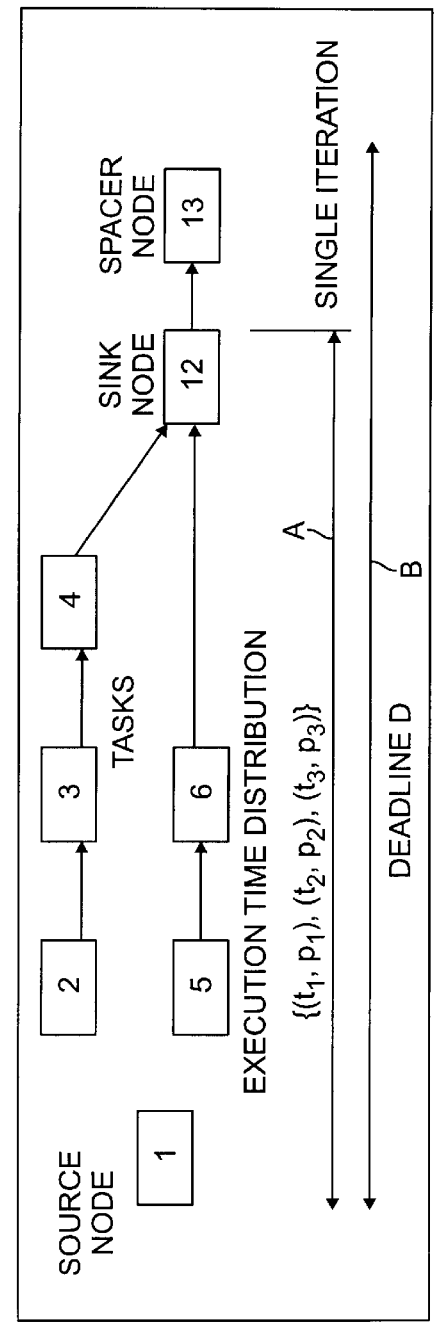
FIG. 4 is a block diagram illustrating a model for specifying an application.

Input Specification (Step 202 of FIG. 3):

Referring to FIG. 4, a model for specifying applications is shown. Each application is specified by a task graph consisting of nodes. The nodes are numerically denoted as 1,2,3, . . . 12; node 1 being the source node and node 12 being the sink node. The nodes represent task-level computations and the arcs, denoted as arrows between nodes, specify precedences between nodes. It is to be understood that splitting of applications into tasks advantageously allows for scheduling at the task level, thus resulting in better control over the performance of applications. Each node is at an algorithmic or functional level of granularity. Arcs specify the order in which tasks are to be run. When multiple arcs merge into a node, the node runs when it receives data from all the input arcs. The execution time of each node is assumed to be a discrete random variable that takes one of the values $t_1$, $t_2$, . . . $t_k$ with probabilities $p_1$, $p_2$, . . . $p_k$ respectively.

Such a distribution models data and control dependencies within a node as well as architectural features. For example, assuming the node is a Huffman encoding block, the execution time depends on the input data. By computing statistics on the nature of the input data, an approximate distribution can be computed. Other architectural features such as, for example, cache behavior, can also be factored in this distribution. It is assumed that such execution time distributions of individual tasks are available as inputs to the methods and apparatus of the invention. While assuming that task execution times are mutually independent, it is to be appreciated that such methods and apparatus of the invention can also model dependencies of execution time between tasks.

Further, as mentioned, the methods and apparatus of the invention preferably assume that the applications are periodic real-time applications, where each iteration of the application processes a frame of data (e.g., a video application processes a 720×480 pixel video frame per iteration). A timing constraint is specified on each iteration. For example, for a 30 frames per second (fps) real-time video application, the period is 33 milliseconds (ms). In a default case, the deadline is set to the period, although this need not always be the case. The processing delay is defined as the actual time taken to process one iteration of the application. Due to task level variability, architectural effects, and the scheduler, the processing delay of an application is typically not a single number. As explained in the context of FIG. 1, the processing delay distribution is the distribution of the actual processing delay.

Further, non-pipelined execution is assumed within each application, i.e., the next iteration of an application starts only after the current iteration, denoted as line A, finishes. The periodic behavior of an application is modeled by introducing a spacer node 13 at the end of each iteration for each application. If the current iteration finishes before the deadline, denoted as line B, the spacer node delays the execution of the next iteration until the deadline has elapsed. In this case, the execution time of the spacer node is represented as (period−elapsed time), where elapsed time is the time elapsed in that application in the current iteration. On the other hand, if the current iteration finishes after the deadline, the samples are released right away and the execution time of the spacer node is zero. It is to be understood that the spacer node is an indication of the slack of the system. When the processing delay of an iteration exceeds the deadline, the deadline is considered missed.

Figure 5:
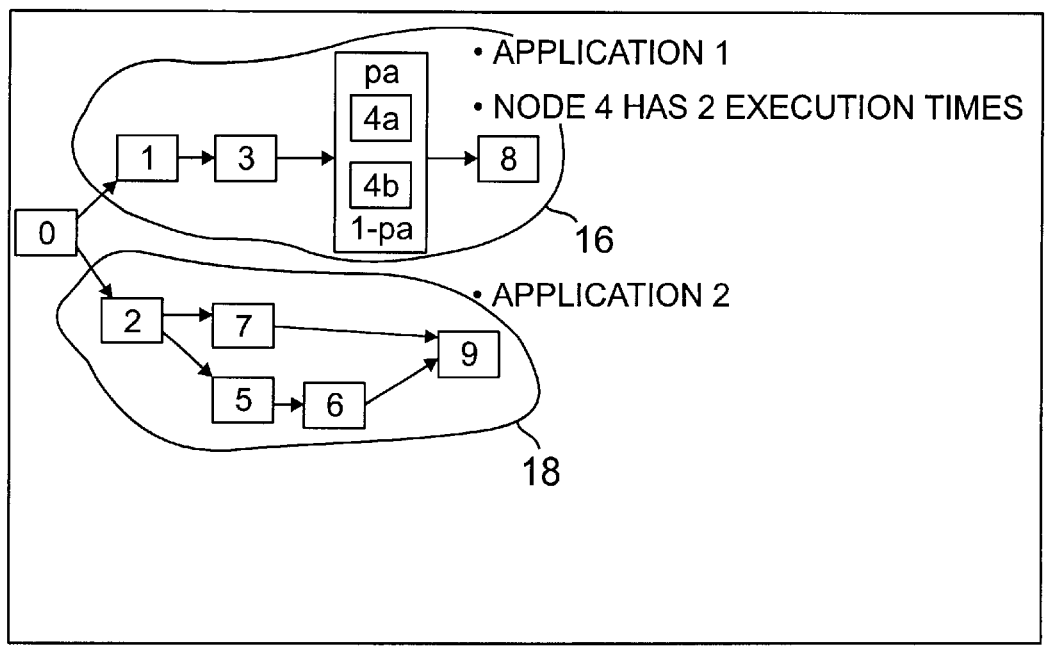
FIG. 5 is an aggregated graphical representation illustrating tasks for two applications.

In order to model multiple concurrent applications, task graphs of individual applications are combined into a single aggregated task graph, as shown in FIG. 5. The measurement interval for the aggregated graph is over an interval up to a regeneration state, which is the state where all applications finish at the same time.

Figure 6:
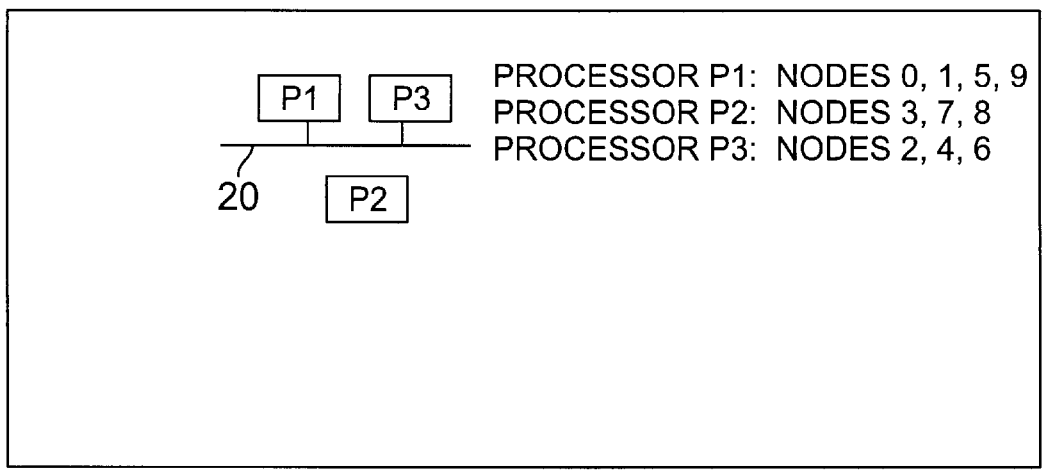
FIG. 6 is a block diagram illustrating a system architecture and mapping of nodes in applications to processors.

It is to be appreciated that, in addition to the specification of the application, the end-system architecture and the scheduler are also to be specified as inputs for use by the methods and apparatus of the invention. As mentioned, the end-systems are preferably embedded systems, e.g., PDAs, set-top boxes, and Internet terminals. The end-system architecture is assumed to include one or more programmable processors, for example, P1, P2 and P3, as shown in FIG. 6. The system may also include hardware accelerators (not shown). Nonetheless, the processors and, if included, the hardware accelerators are connected via a communication fabric or system bus 20. The mapping of tasks is assumed to be fixed and specified as an input to the system. It is to be understood that each processor supports a run-time scheduler, such as EDF, RM, FCFS, which selects the next task to run on the processor. The user selects the scheduler to be used in the analysis.

Also, it is to be appreciated that the evaluation processor 100 (FIG. 2) of the invention is operatively coupled to the same system bus 20 as the end-system processors (P1, P2, P3). However, the methodology of the invention performed by the processor 100 may be implemented on one or more of such end-system processors.

Figure 7:
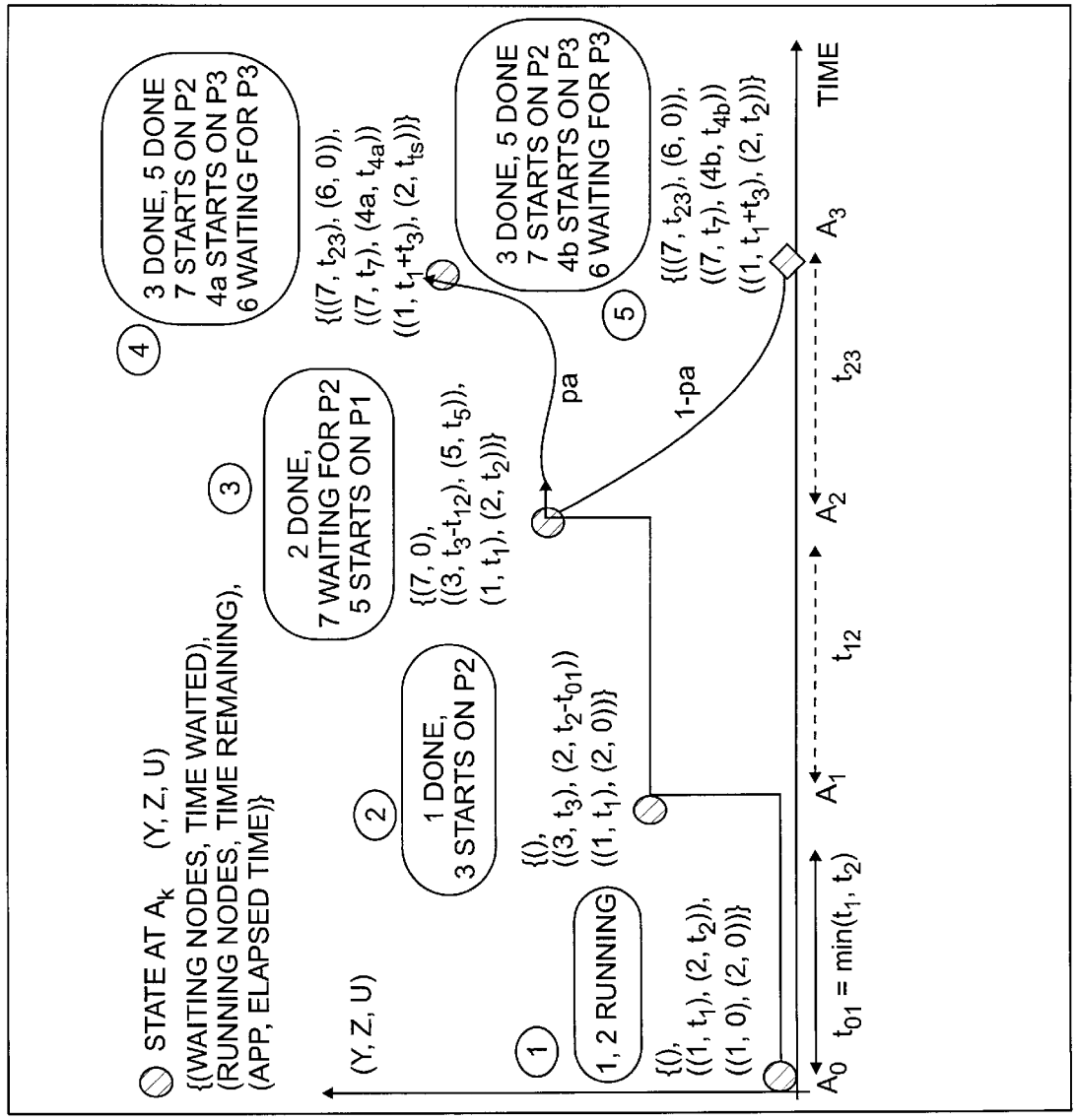
FIG. 7 is a graphical representation illustrating a state process.

State Process Generation (Step 204 of FIG. 3):

Thus, having specified the set of applications, the end-system architecture, and the run-time scheduling policy, the methods and apparatus of the invention characterize the evolution of computation in the system as a state process. FIGS. 5, 6, and 7 illustrate the generation of the state process with two concurrent applications running on three processors. Particularly, FIG. 5 shows portions of two applications running concurrently. Application 1, denoted by reference numeral 16, includes nodes 1, 3, 4, and 8. Node 4 has two execution times. Application 2, denoted by reference numeral 18, includes nodes 2, 5, 6, 7, and 9. Node 0 is the source node. FIG. 6 shows the selected system architecture including three processors, P1, P2, and P3. FIG. 7 shows the generated state space. It is to be understood that the number of applications and processors in this example is chosen for purposes of explaining the state process and, as such, the invention is not limited to these particular numbers.

Whenever any node finishes running, there is a change of state in the system. The scheduling policy, precedences, and available resources, e.g., processors and hardware accelerators, determine the next node selected for running and, thus, the next state. Since the execution time of each node is a random variable (FIG. 1), the transitions from one state to the next are probabilistic.

The variables that define the state of computation as a function of time will now be defined. Let a transition sequence $A=\{A_n\}$, $n=0, 1, \ldots$, be the time-instants when the state of computation changes. Further, a vector sequence Y is defined as $Y=\{Y_n\}$, $n=0, 1, \ldots$, where $Y_n=(l,w_I)=$(set of nodes ready and waiting at transition time $A_n^-$, the delay incurred by these nodes thus far), where $A_n^-$ denotes the time just prior to the nth transition time. Also, a sequence Z is defined as $Z=\{Z_n\}$, $n=0, 1, \ldots$, where $Z_n=(J,r_J)=$(set of nodes running at transition time $A_n^-$, remaining execution time of these nodes). Sequences Z and Y capture information about running and waiting nodes. Still further, a sequence U is defined as $U=\{U_n\}$, $n=0, 1, \ldots$, where $U_n=\{(App,t^{APP})$ for all applications$\}=$(application, elapsed time of application at time $A_n^-$). $t^{APP}$ is set to zero at the start of each application iteration, and is incremented at transitions when nodes in that iteration finish running or finish waiting. Accordingly, (Y,Z,U) models the state of computation in the system.

FIG. 7 illustrates the generation of the state process for the simple example with two concurrent applications (as shown in FIG. 5) running on three processors (as shown in FIG. 6). For the purpose of simplicity, assume that only one node, i.e., node 4, has a variable execution time specified by a distribution $\{(t_{4a}, pa), (t_{4b}, 1-pa)\}$. All other nodes i are assumed to have deterministic execution times $t_i$. Mapping of nodes to processors is as follows: processor P1 runs nodes 0, 1, 5, and 9; processor P2 runs nodes 3, 7, and 8; and processor P3 runs nodes 2, 4, and 6. It is also assumed that the communication costs are zero, to simplify the explanation. Suppose that a rate-monotonic scheduling policy is selected, where application 1, i.e., reference numeral 16, has a higher priority. In such a static priority scheme, all nodes in an application are assumed to inherit the same priority. The evolution of state proceeds as follows.

Initially, nodes 1 and 2 start running on processors P1 and P3. The state at $A_0$ is $\{(\ ), ((1,t_1), (2,t_2)), (1,0), (2,0)\}$ which is elaborated as: {(no waiting nodes), (node 1 running with remaining time $t_1$, node 2 running with remaining time $t_2$), (application 1 with elapsed time 0, application 2 wit elapsed time 0)}. Suppose that $t_1 < t_2$. At $t_1$, node 1 finishes and there is a state change in the system. Only one transition is possible at this time: node 3 starts running on P2 with remaining time $t_3$. Node 2 is still running with remaining time $t_2-t_1$. At time $t_2$, node 2 finishes. Node 5 and 7 ready. Node 7 is mapped to P2 which is concurrently running node 3. Task 3 has a higher priority and, thus, node 7 goes on the waiting list, while node 5 starts running. It is to be appreciated that preemption can also be implemented here. Suppose next that at time $t_1+t_3$, nodes 3 and 5 finish. Nodes 7, 6, and 4 are ready to run. Since nodes 4 and 6 are mapped to the same processor (P3), the run-time scheduler selects one based on priorities. This example assumes a static priority scheme, with application 1 having a higher priority than application 2. In this case node 4 is set to run and node 6 goes on the waiting list.

It is to be appreciated that other scheduling policies can be similarly modeled. Suppose the EDF policy were used: the elapsed times in the two applications are $t_1+t_3$ and $t_2+t_5$. The priorities of the two nodes get dynamically computed as $D_1-(t_1+t_3)$ and $D_2-(t_2+t_5)$, where $D_1$ and $D_2$ are the deadlines of the two applications. This priority can vary from iteration to iteration, depending on the elapsed times. The selection of the next node to run is made using information carried in the current state only. There are two possible execution times for node 4, leading to two possible states at this point, with transition probabilities pa and 1-pa. Continuing further, suppose node 8 finishes before node 9. Application 1 then starts its next iteration, running node 1 again.

As the state process continues its evolution, it repeats its evolution after a special state referred to as the regeneration state. The regeneration point is the state when all applications finish at the same time. In the example illustrated by FIGS. 5, 6, and 7, the state process traversal continues until both applications end at the same time instant, i.e., nodes 8 and 9 finish at the same time. Advantageously, the joint sequence (Y,Z,U) represents the state of computation at each transition and is a Markov chain. By joining the state of computation between transitions by straight lines, the state process X is obtained. X is a continuous time stochastic process and since its underlying jump process (Y,Z,U) is Markovian, X is a semi-Markov process.

Since the state process is semi-Markovian, it regenerates. i.e., repeats the same behavior, at the regeneration state. Thus, the statistics on this process are computed mathematically by analyzing the behavior of a single traversal through the state space using the conventional Markov renewal theory. Although this is an enumeration of all states, it is to be understood that a single traversal of the state space is enough to compute statistics. Alternatively, if the system were being simulated, using a conventional approach, it would have to be simulated several times to get reliable statistics, due to probabilistic execution times. Advantageously, the methods and apparatus of the invention provide a faster approach since a single exploration of the state space can be efficiently accomplished regardless of the size of the state space.

The invention includes a state space generator which performs a recursive procedure that computes the state space using a depth-first traversal. The output of the generator is a set of all possible states in the system, where each state is characterized by the tuple (Y,Z,U) and the transition probability $R_{s1}^{s2}$ between all states s1, e.g., (i,j,a), and s2, e.g., (k,l,c).

Figure 8:
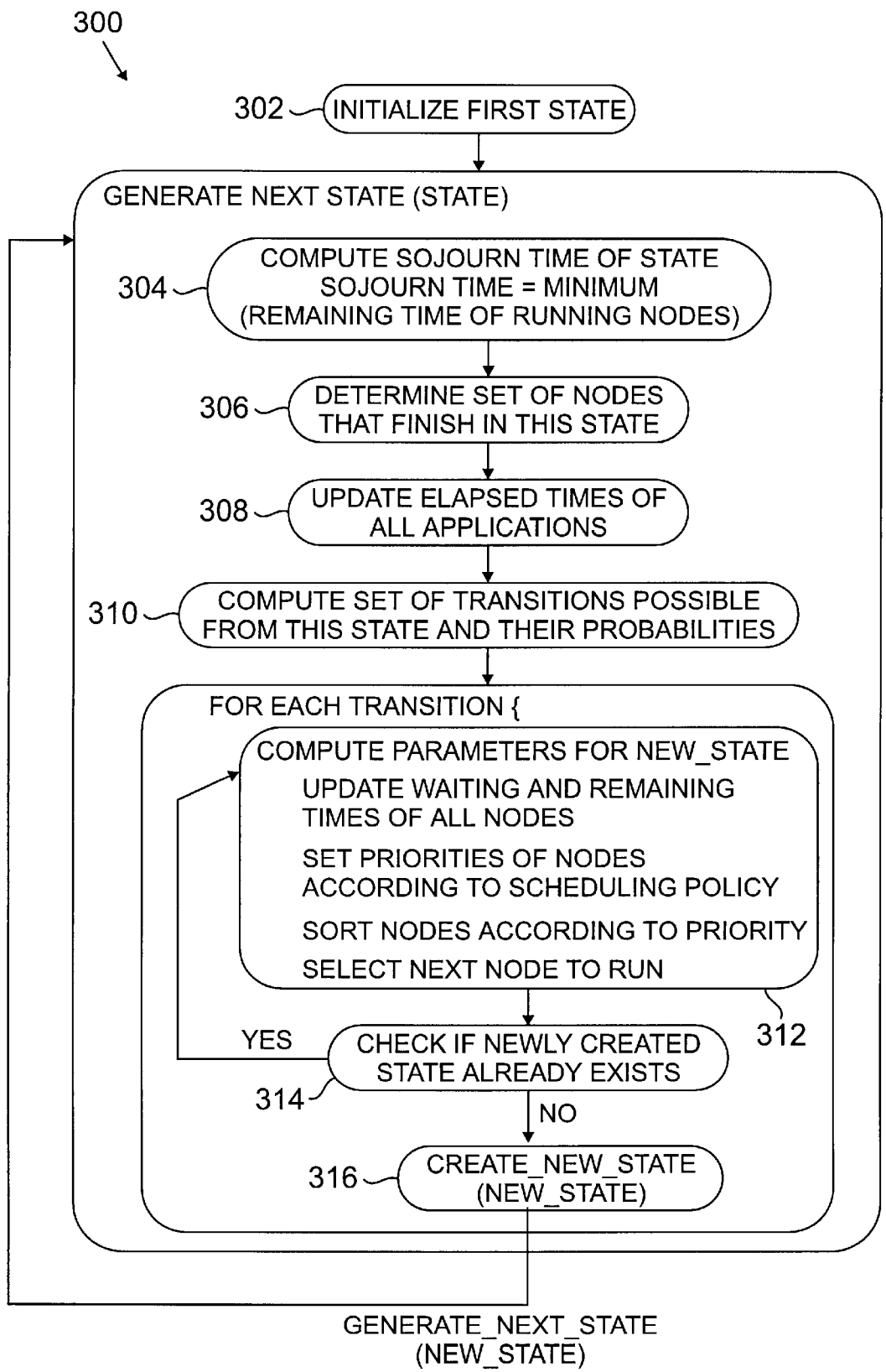
FIG. 8 is a flow chart illustrating a recursive procedure for generating state space according to the present invention.

FIG. 8 is a flow chart illustrating a recursive methodology 300 used to generate the state space according to the invention. It is to be appreciated that, in order to generate each state of the state space, the invention determines the next state, given the previous state, as a function of, inter alia, the specified run-time scheduling policy. Examples of the steps of FIG. 8 will be given with respect to the above illustration of FIG. 7. To start, a first state is initialized (step 302). An example of step 302 is shown in FIG. 7, as the initial state at $A_0$. After the first state is initialized, the next state can be generated. First, in step 304, the sojourn time of the state is computed. The sojourn time is defined as the minimum remaining time of running nodes. As an example of step 304, the sojourn time in generating the next state in FIG. 7 is $t_{01}$, since $t_{01}$ is the minimum remaining running time of nodes 1 and 2. Next, in step 306, the set of nodes that finish in this state is determined, e.g., node 1 in FIG. 7. Then, the elapsed times of the applications are updated (step 308). In step 310, the set of transitions possible from this state and their probabilities are computed. Then, for each transition, the parameters for the new state (next state) are computed (step 312). This includes updating the waiting and remaining times of all nodes; setting priorities of nodes according to the selected scheduling policy; sorting nodes according to priority; and selecting the next node to run. It is to be understood that the steps of setting priorities of nodes and sorting of nodes are dependent on the run-time scheduler selected. That is, if a priority-based scheduler is specified, e.g., RM or EDF, these steps follow the priorities respectively established by these schedulers. In the case of a nonpriority-based scheduler, such as FCFS, there is no priority set and running of the nodes is on a first-come first-served basis.

Next, in step 314, a check is made to determine if the newly created state already exists. If it does, then step 312 is repeated. If not, then the new state is created (step 316). An example of performing steps 308 through 316 is shown in FIG. 7, where the state at A, is the new state created after the state at $A_0$. Then, the procedure repeats in order to generate the next state after the state just created. Once the state process X is generated, as explained above, the methods and apparatus of the invention then compute the statistics of this state process and use it to derive the processing delay distribution.

Compute Performance Metrics (Step 206 in FIG. 3):

Computation of the performance metrics includes computing the stationary distribution of (Y,Z,U), the processing delay distribution and the excess delay (deadline miss) probability. These computations will be discussed in such order.

Once the state process is generated, its stationary distribution is then computed. Recall that the joint process (Y,Z,U) is a discrete-time Markov chain. This means that when (Y,Z,U) jumps from state (i,j,a) to (k,l,c), its future evolution is independent of the past, given (i,j,a). This chain is therefore completely specified in terms of its transition probability function defined by $R_{ija}^{klc}$, which is the probability that (Y,Z,U) moves from a state (i,j,a) to (k,l,c) in a single jump. Generally, the stationary distribution $\pi_s$ is the probability that the process jumps to state s, given that a jump occurred, that is, given that (Y,Z,U) changes state. The stationary distribution $\pi$ is computed by solving the following linear equations using a conventional Jacobi iterative process:

$$\sum_{ija \in s} \pi_{ija} R_{ija}^{klc} = \pi_{klc} \quad (1)$$

$$\sum_{klc \in s} \pi_{klc} = 1 \quad (2)$$

Next, the processing delay distribution is computed. Suppose it is desirable to determine the probability that the processing delay (PD) of an application exceeds a value T. Then, Pr {PD>T} is the ratio of the number of times PD exceeds T to the number of times the application is activated in the regeneration interval. Let node b be the predecessor to the spacer node. Then, the expression for the processing delay distribution for an application is represented as:

$$\frac{\sum_{\text{for all } ija} \pi_{ija} | b \in J, r_b = t_b, t^{App} + t_b > T}{\sum_{\text{for all } ija} \pi_{ija} | b \in J, r_b = t_b} \quad (3)$$

The numerator in this expression is a sum of $\pi$ over all states such that node b has just started running and the elapsed time of the application exceeds time T. Note the three constraints on $\pi$: $b \in J$, $r_b = t_b$, and $t_b$, $t^{App} + t_b > T$. Since J is the set of running nodes, $b \in J$ implies that node b is running. The second condition $r_b = t_b$ means that the remaining time $r_b$ for node b is equal to its execution time $t_b$. This ensures that only the those states where node b has just started running are considered. The third constraint $t^{App} + t_b > T$ ensures that only those states where the elapsed time has exceeded T are considered. The denominator of the expression is the sum of $\pi$ over all states where node b has just started running. The expression is the fraction of the times that the processing delay exceeds T.

Lastly, in order to compute the deadline miss probability ($P_{excess}$), which is the probability that the processing delay of an application exceeds its deadline D, T is simply set equal to D in equation Given a detailed description of the methodology of the invention, the following is a description of an exemplary implementation of such methodology to evaluate the effect of different run-time schedulers on the performance of multimedia applications. In this example, we consider an audio application, e.g., linear predictive coding (LPC) decode, and a video application, e.g., MPEG decode at 15 fps, running concurrently on an end-system with a single processor. The applications have 9 and 15 nodes respectively. The execution distribution for individual tasks within each application were obtained by profiling on a Sun Sparc processor. For the particular processor, the deadlines on the two applications translate to 200 and 660 units respectively. These applications are tested for three different scheduling policies: FCFS, RM, and EDF.

Table 2 summarizes the processing delay distribution when video and audio run concurrently under three different run-time scheduling policies.

TABLE 2

| Performance metrics (audio, video) | FCFS | RM | EDF |
|---|---|---|---|
| $P_{excess}$ | (0.462, 0.007) | (0.0235, 0.52) | (0.175, 0.227) |
| $PD_{ave}$ | (198.0, 501.0) | (118.4, 685.9) | (169.3, 615.7) |
| $\sigma$ | (77.5, 54.3) | (29.34, 94.72) | (61.59, 58.07) |
| $PD_{max}$ | (450, 680) | (290, 980) | (380, 840) |

The FCFS column summarizes the results for FCFS. In FCFS, nodes are set to run in the order in which they become ready. The audio application is seen to miss 46% of its deadlines ($P_{excess}$), while the video application never misses the deadline. The average processing delay ($P_{ave}$), the variance ($\sigma$), and the worst-case delay ($PD_{max}$) for both the applications are also included. The next column shows the results for the RM scheduler. In RM, priorities of the nodes are set according to their periods. In this case, audio has a higher priority over video. Note that shifting from FCFS to RM reduces the probability of deadline misses for the audio application from 46% to 2%. The worst-case delay also reduces. However, the performance of the video application gets degraded significantly, from no misses to over 50% misses. The last column indicates the effect of an EDF scheduler. In EDF, the priorities are computed at run-time; the node whose due date is the earliest gets the highest priority. This scheduler performs better than the other two and appears to be a good compromise for both applications. Other custom schedulers may be evaluated in a similar manner. Accordingly, the methods and apparatus of the present invention provide such scheduler impact information to a user designing an end-system, such as an embedded end-system, for running applications, such as multimedia applications. It is to be understood that the information may be indicated to the designer, for example, on a CRT display operatively coupled to the processor 100 (FIG. 2).

Table 2 illustrates the utility of a distribution of the processing delay against just the worst-case value. Considering the RM scheduler, the worst-case processing delay for audio is 290. However, the distribution indicates that the mean is 118, the standard deviation is 29, and only 2% of all samples miss deadlines. This is much more valuable than knowing that the worst-case execution is 290. Using worst-case processing delay is very conservative and could lead to inefficient system design. Typically, multimedia applications have constraints such as "no more than x % samples should miss deadlines." Advantageously, the processing delay distribution is better suited for evaluating such constraints. Such methodology is also quite efficient. For example, experimentation for the EDF case resulted in generation of a state space with about 20,000 states and took approximately 30 minutes to compute the processing delay distribution on a Sun Sparc20 Workstation.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of evaluating an effect of a run-time scheduling policy on a performance of an end-system, having associated resources, running one or more applications, each application having one or more tasks and the tasks being mapped to the associated resources of the end-system, the method comprising the steps of:

spawning a state process having a state space representative of an evolution of computation associated with the end-system, the evolution being representative of task transitions with respect to at least the applications, available resources and the run-time scheduling policy; and deriving performance metrics from the state process, the performance metrics being representative of the effect of the run-time scheduling policy on the performance of the one or more applications running on the end-system.

2. The method of claim 1, wherein the step of computing performance metrics includes the step of computing one of a stationary distribution, a processing delay distribution, and a deadline miss probability as a function of the specified run-time scheduling policy.

3. The method of claim 1, wherein generation of states within the state space includes the steps of:

initializing a first state;

computing a sojourn time of a next state;

determining a set of tasks which finish in the next state;

updating elapsed times of the one or more applications;

computing a set of transitions possible from the next state and probabilities associated with each transition in the set;

for each transition, computing parameters for the next state;

for each transition, computing new parameters for the next state when the next state already exists; and for each transition, designating the next state as the new state when the next state does not already exist.

4. The method of claim 3, wherein the step of computing parameters includes the steps of:

updating waiting and remaining times of the tasks;

setting priorities, if any, of task-level computations according to the run-time scheduling policy;

sorting the task-level computations according to the run-time scheduling policy; and selecting a next task-level computation to run.

5. The method of claim 1, wherein the one or more applications are multimedia applications.

6. The method of claim 1, wherein each application is specified by a task graph consisting of nodes and arcs, the nodes being representative of the tasks associated with the application, the arcs being representative of precedences between nodes.

7. The method of claim 1, wherein the end-system is an embedded end-system.

8. The method of claim 7, wherein the embedded end-system is one of a personal digital assistant, a set-top box, and an Internet terminal.

9. The method of claim 1, wherein the run-time scheduling policy is priority-based.

10. The method of claim 9, wherein the priority-based run-time scheduling policy is one of a rate monotonic policy and an earliest deadline first policy.

11. The method of claim 1, wherein the run-time scheduling policy is a first-come first-served policy.

12. The method of claim 1, wherein the step of generating the state process includes the step of generating a joint sequence (Y,Z,U) which represents a state of computation at each transition in a semi-Markov process where:

Y is a vector sequence defined as $\{Y_n\}$, n=0, 1, . . . , where $Y_n=(I,w_1)$, where I is a set of nodes ready and waiting at a transition time $A_n^-$, where $w_1$, is a delay incurred by the nodes thus far, and where $A_n^-$ denotes a time just prior to an nth transition time;

Z is a vector sequence defined as $\{Z_n\}$, n=0, 1, . . . , where $Z_n=(J,r_J)$, where J is a set of nodes running at the transition time $A_n^-$, where $r_J$ is a remaining execution time of the nodes; and U is a vector sequence defined as $\{U_n\}$ n=0, 1, . . . , where $U_n=\{(App,t^{APP})$ for all applications$\}$, where App is the application, and where $t^{APP}$ is an elapsed time of the application at time $A_n^-$.

13. The method of claim 12, wherein a collection of the joint sequences (Y,Z,U) is represented as the state space s.

14. The method of claim 13, wherein the step of computing performance metrics includes computing a transition probabilities $R_{ija}^{klc}$ from a first state (i,j,a) to a second state (k,l,c).

15. The method of claim 14, wherein the step of computing performance metrics includes the step of computing a stationary distribution $\pi$ of the joint sequence (Y,Z,U) by solving the following equations:

$$\sum_{ija \in s} \pi_{ija} R_{ija}^{klc} = \pi_{klc}$$

-continued $$\sum_{klc \in s} \pi_{klc} = 1.$$

16. The method of claim 15, wherein the step of computing performance metrics includes the step of computing a processing delay distribution by dividing a sum of π over all states, such that a node of interest has just started running and the application exceeds a time T, by a sum of π over all states such that the node of interest has just started running.

17. The method of claim 16, wherein the step of computing performance metrics includes the step of computing a deadline miss probability by setting the time T equal to a deadline of the application.

18. Apparatus for evaluating an effect of a run-time scheduling policy on a performance of an end-system, having associated resources, running one or more applications, each application having one or more tasks and the tasks being mapped to the associated resources of the end-system, the apparatus comprising:

means for spawning a state process having a state space representative of an evolution of computation associated with the end-system, the evolution being representative of task transitions with respect to the applications, available resources and the run-time scheduling policy; and means for deriving performance metrics from the state process, the performance metrics being representative of the effect of the specified run-time scheduling policy on the performance of the one or more applications running on the end-system.

19. The apparatus of claim 18, wherein the state process generation means further includes:

means for initializing a first state;

means for computing a sojourn time of a next state;

means for determining a set of tasks which finish in the next state;

means for updating elapsed times of the one or more applications;

means for computing a set of transitions possible from the next state and probabilities associated with each transition in the set;

for each transition, means for computing parameters for the next state;

for each transition, means for computing new parameters for the next state when the next state already exists; and for each transition, means for designating the next state as the new state when the next state does not already exist.

20. The apparatus of claim 19, wherein the means for computing parameters further includes:

means for updating waiting and remaining times of the tasks;

means for setting priorities, if any, of task-level computations according to the run-time scheduling policy;

means for sorting the task-level computations according to the run-time scheduling policy; and means for selecting a next task-level computation to run.

21. The apparatus of claim 18, wherein the one or more applications are multimedia applications.

22. The apparatus of claim 18, wherein each application is specified by a task graph consisting of nodes and arcs, the nodes being representative of the tasks associated with the application, the arcs being representative of precedences between nodes.

23. The apparatus of claim 18, wherein the end-system is an embedded end-system.

24. The apparatus of claim 23, wherein the embedded end-system is one of a personal digital assistant, a set-top box, and an Internet terminal.

25. The apparatus of claim 18, wherein the run-time scheduling policy is priority-based.

26. The apparatus of claim 25, wherein the priority-based run-time scheduling policy is one of a rate monotonic policy and an earliest deadline first policy.

27. The apparatus of claim 18, wherein the run-time scheduling policy is a first-come first-served policy.

28. The apparatus of claim 18, wherein the means for generating the state process includes means for generating a joint sequence (Y,Z,U) which represents a state of computation at each transition in a semi-Markov process where:

Y is a vector sequence defined as $\{Y_n\}$, n=0, 1, ..., where $Y_n=(I,w_I)$, where I is a set of nodes ready and waiting at a transition time $A_n^-$, where $w_I$ is a delay incurred by the nodes thus far, and where $A_n^-$ denotes a time just prior to an nth transition time;

Z is a vector sequence defined as $\{Z_n\}$, n=0, 1, ..., where $Z_n=(J,r_J)$, where J is a set of nodes running at the transition time $A_n^-$, where $r_J$ is a remaining execution time of the nodes; and U is a vector sequence defined as $\{U_n\}$, n=0, 1, ..., where $U_n=\{(App,t_{App})$ for all applications$\}$, where App is the application, and where $t^{App}$ is an elapsed time of the application at time $A_n^-$.

29. The apparatus of claim 28, wherein a collection of the joint sequences (Y,Z,U) is represented as the state space s.

30. The apparatus of claim 29, wherein the means for computing performance metrics includes means for computing a transition probabilities $R_{ija}^{klc}$ from a first state (i,j,a) to a second state (k,l,c).

31. The apparatus of claim 30, wherein the means for computing performance metrics includes means for computing a stationary distribution s of the joint sequence (Y,Z,U) by solving the following equations:

$$\sum_{ija \in s} \pi_{ija} R_{ija}^{klc} = \pi_{klc}$$

$$\sum_{klc \in s} \pi_{klc} = 1.$$

32. The apparatus of claim 31, wherein the means for computing performance metrics includes means for computing a processing delay distribution by dividing a sum of π over all states, such that a node of interest has just started running and the application exceeds a time T, by a sum of π over all states such that the node of interest has just started running.

33. The apparatus of claim 32, wherein the means for computing performance metrics includes means for computing a deadline miss probability by setting the time T equal to a deadline of the application.

34. The apparatus of claim 18, wherein the means for computing performance metrics includes means for computing one of a stationary distribution, a processing delay distribution, and a deadline miss probability as a function of the specified run-time scheduling policy.

35. A method of evaluating an effect of a run-time scheduling policy on a performance of an end-system, having an associated resource architecture, running one or more applications, each application having one or more tasks with task execution times respectively associated therewith, the method comprising the steps of:

obtaining the applications for execution on the end-system, and a specification of at least (i) task execution times associated with the tasks of each application, (ii) the resources associated with the end-system, (iii) a mapping of tasks associated with the applications to resources associated with the end-system architecture, and (iv) the run-time scheduling policy;

generating a state process having a state space representative of an evolution of computation associated with the end-system, the evolution being representative of task transitions with respect to the applications, available resources and the run-time scheduling policy;

computing performance metrics from the state process, the performance metrics being representative of the effect of the specified run-time scheduling policy on the performance of the one or more applications running on the end-system; and supplying as an output results of the performance metric computations.

36. The method of claim 35, further comprising the step of determining from at least a portion of the results whether a task will not complete within a deadline.

37. Apparatus for evaluating an effect of a run-time scheduling policy on a performance of an end-system, having an associated resource architecture, running one or more applications, each application having one or more tasks with task execution times respectively associated therewith, the apparatus comprising:

a memory for storing specified data including at least (i) the applications for execution on the end-system, (ii) task execution times associated with the tasks of each application, (iii) the resources associated with the end-system, (iv) a mapping of tasks associated with the applications to resources associated with the end-system architecture, and (v) the run-time scheduling policy; and a processor for generating a state process having a state space representative of an evolution of computation associated with the end-system, the evolution being representative of task transitions with respect to the applications, available resources and the run time scheduling policy, the processor then computing performance metrics from the state process, the performance metrics being representative of the effect of the specified run-time scheduling policy on the performance of the one or more applications running on the end-system.

38. A storage medium containing a computer-executable program for evaluating an effect of a run-time scheduling policy on a performance of an end-system, having associated resources, running one or more applications, each application having one or more tasks and the tasks being mapped to the associated resources of the end-system, the program comprising the steps of:

generating a state process having a state space representative of an evolution of computation associated with the end-system, the evolution being representative of task transitions with respect to the applications, available resources and the run-time scheduling policy; and computing performance metrics from the state process, the performance metrics being representative of the effect of the run-time scheduling policy on the performance of the one or more applications running on the end-system.

* * * * *